United States Patent
Kuroda

(10) Patent No.: US 10,237,518 B2
(45) Date of Patent: Mar. 19, 2019

(54) MOBILE BODY SYSTEM, CONTROL APPARATUS AND METHOD FOR CONTROLLING A MOBILE BODY

(71) Applicant: Sharp Kabushiki Kaisha, Osaka (JP)

(72) Inventor: Tatsuro Kuroda, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 81 days.

(21) Appl. No.: 15/055,675

(22) Filed: Feb. 29, 2016

(65) Prior Publication Data

US 2016/0366372 A1 Dec. 15, 2016

(30) Foreign Application Priority Data

Jun. 12, 2015 (JP) .................................. 2015-119308

(51) Int. Cl.
```
H04N 7/18      (2006.01)
H04N 5/93      (2006.01)
H04N 9/82      (2006.01)
G06K 9/00      (2006.01)
```
(52) U.S. Cl.
CPC ............. H04N 7/185 (2013.01); H04N 5/93 (2013.01); H04N 9/8205 (2013.01); G06K 9/00771 (2013.01); G06K 9/00791 (2013.01)

(58) Field of Classification Search
CPC .. G06K 9/00771; G06K 9/00791; H04N 5/93; H04N 7/185; H04N 9/8205
USPC ........................................................ 348/116
See application file for complete search history.

(56) References Cited

U.S. PATENT DOCUMENTS

| | | | |
|---|---|---|---|
| 9,373,149 B2* | 6/2016 | Abhyanker | G06Q 50/28 |
| 9,488,489 B2* | 11/2016 | Hensel | G01C 21/3647 |
| 10,042,359 B1* | 8/2018 | Konrardy | G05D 1/0088 |
| 10,065,517 B1* | 9/2018 | Konrardy | G05D 1/0088 |
| 2004/0008221 A1* | 1/2004 | O'Neal | G01N 30/56 |
| | | | 715/730 |
| 2006/0018516 A1* | 1/2006 | Masoud | G06K 9/00342 |
| | | | 382/115 |

(Continued)

FOREIGN PATENT DOCUMENTS

JP  2006-124986 A  5/2006

OTHER PUBLICATIONS

Wang et al, Person-of-interest detection system using cloud-supported computerized-eyewear, 2013.*

*Primary Examiner* — Shan E Elahi
(74) *Attorney, Agent, or Firm* — ScienBiziP, P.C.

(57) ABSTRACT

A mobile body photographs an image with a camera while moving, and transmits to a control apparatus image data representing the photographed image and state information indicating the state thereof including the location thereof. The control apparatus displays a map including a moving range of the mobile body on a display unit and overlays a route of the mobile body on the map to display the route. The control apparatus detects an occurrence of an event such as finding of an intruder and the location of the mobile body at the time of the occurrence of the event, based on the received image data and state information, and displays a marker indicating the detected location over the map. Whenever an event occurs, an additional marker is displayed over the map and the history of the past events is recorded on the map.

14 Claims, 14 Drawing Sheets

(56) References Cited

U.S. PATENT DOCUMENTS

| | | | |
|---|---|---|---|
| 2006/0271286 A1* | 11/2006 | Rosenberg | G01C 21/3647 701/431 |
| 2008/0051997 A1* | 2/2008 | Rosenberg | G01C 21/3647 701/431 |
| 2010/0097470 A1* | 4/2010 | Yoshida | G08B 13/19641 348/159 |
| 2012/0271723 A1* | 10/2012 | Penilla | G06Q 20/18 705/16 |
| 2013/0103303 A1* | 4/2013 | Lynch | G01C 21/3638 701/410 |
| 2014/0136414 A1* | 5/2014 | Abhyanker | G06Q 50/28 705/44 |
| 2014/0143061 A1* | 5/2014 | Abhyanker | G06Q 50/01 705/14.58 |
| 2015/0127479 A1* | 5/2015 | Penilla | G06Q 20/18 705/26.1 |
| 2015/0134467 A1* | 5/2015 | Penilla | G06Q 20/18 705/16 |
| 2015/0134546 A1* | 5/2015 | Penilla | G06Q 20/18 705/305 |
| 2015/0178034 A1* | 6/2015 | Penilla | G06Q 20/18 345/1.1 |
| 2015/0202770 A1* | 7/2015 | Patron | G05D 1/024 700/245 |
| 2016/0080699 A1* | 3/2016 | Scholl | G06T 15/20 348/148 |
| 2016/0104486 A1* | 4/2016 | Penilla | H04L 67/12 704/232 |
| 2016/0309123 A1* | 10/2016 | Edwards | H04N 7/181 |
| 2017/0080898 A1* | 3/2017 | Cogill | B60R 25/30 |
| 2017/0154371 A1* | 6/2017 | Harvey | G06Q 30/0617 |
| 2017/0242442 A1* | 8/2017 | Minster | G05D 1/0248 |
| 2018/0082494 A1* | 3/2018 | Rech | G01C 21/3415 |
| 2018/0292829 A1* | 10/2018 | Li | G05D 1/0212 |

* cited by examiner

F I G. 7
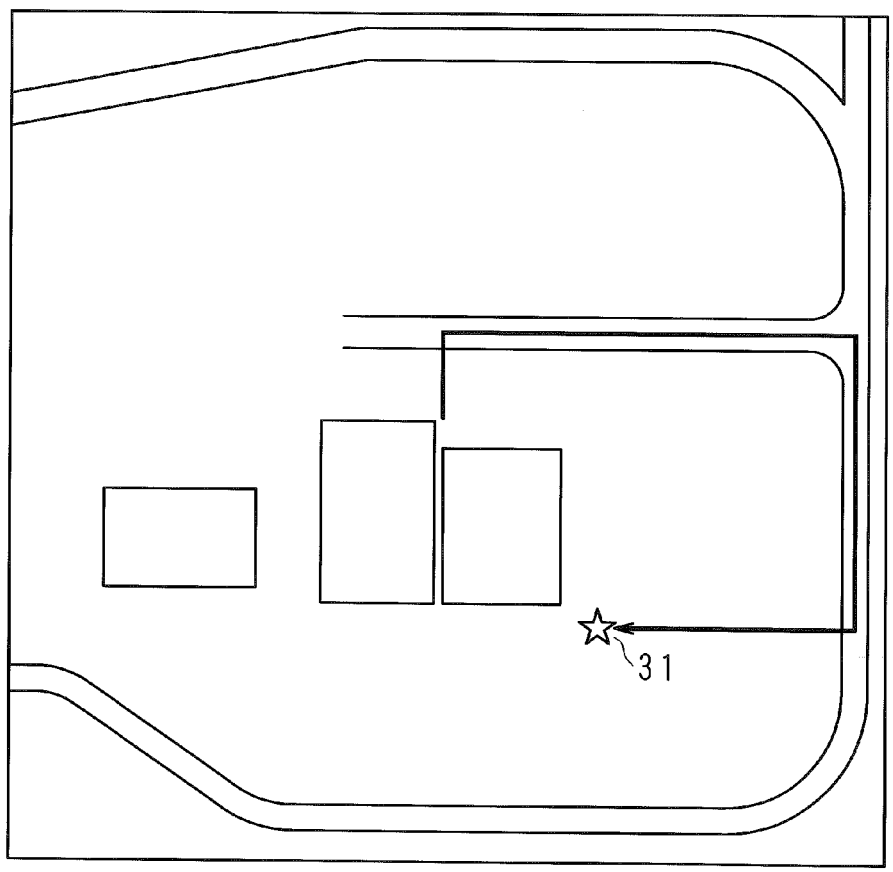

MOBILE BODY SYSTEM, CONTROL APPARATUS AND METHOD FOR CONTROLLING A MOBILE BODY

CROSS-REFERENCE TO RELATED APPLICATIONS

This non-provisional application claims priority under 35 U.S.C. § 119(a) on Patent Application No. 2015-119308 filed in Japan on Jun. 12, 2015, the entire contents of which are hereby incorporated by reference.

BACKGROUND

1. Technical Field

The present invention relates to a mobile body system, a control apparatus and a method for controlling a mobile body.

2. Description of Related Art

An autonomous mobile body equipped with a camera is proposed to be used in a method for patrolling. For example, the mobile body photographs an image outside the mobile body using the camera while traveling along a specific route, and the image photographed by the mobile body is displayed at a display device in a security office.

In the conventional technology, a map including the route of the mobile body is displayed on the display device and the user performs manipulation for modifying the route shown in the map to control the mobile body. If an event such as finding of an intruder occurs, the display device displays an alarm to notify the user of the event. Japanese Patent Application Laid-open Publication No. 2006-124986 discloses the control technology for controlling multiple working machines that spray atomizing agent by using a map displayed on a display device.

SUMMARY OF THE INVENTION

In the conventional technology, the alarm displayed on the display device can be erased. Once the alarm is erased, the user cannot check the past event. In particular, the map displayed on the display device remains unchanged even when an event occurs, which make it impossible to check where the event has occurred. Therefore, it is difficult to grasp the place where the event occurred to take preventive measures.

The present invention is made in consideration of the above-described circumstances, and the object thereof is to provide a mobile body system, a control apparatus and a method for controlling a mobile body, capable of recording a history of events to facilitate preventive measures for events.

A mobile body system according to the present invention, comprising: a mobile body performing photography; and a control apparatus. The mobile body includes a transmitting part for transmitting to the control apparatus image data presenting a photographed image and state information indicating a state of the mobile body. The control apparatus includes: a receiving part for receiving the image data and the state information; a display unit for displaying a map including a moving range of the mobile body; an event detecting part for detecting that a specific event occurs to the mobile body based on the received image data or state information; a location detecting part for detecting a location of the mobile body at the time of the occurrence of the event, based on the state information; and a marker displaying part for displaying on the display unit a marker indicating the location detected by the location detecting part on the map.

In the mobile body system according to the present invention, a route of the mobile body is displayed over the map on the display unit.

In the mobile body system according to the present invention, the marker displaying part displays a different marker on the display unit according to details of the event.

In the mobile body system according to the present invention, the control apparatus further includes a storage unit in which event information including details of the event and the location is stored.

In the mobile body system according to the present invention, the event information includes a time when the event detecting part has detected the occurrence of the event.

The mobile body system according to the present invention, further comprising: a plurality of the control apparatuses; and a storage apparatus for storing the event information related to the plurality of control apparatuses. Each of the plurality of control apparatuses controls the mobile body with a different moving range. The storage apparatus includes a statistical processing part for executing statistical processing for the entire event information related to all of the plurality of control apparatuses or for the event information related to each of the control apparatuses. The control apparatus further includes: an obtaining part for obtaining from the storage apparatus a statistical result of the statistical processing executed by the statistical processing part; and a statistical result displaying part for displaying the obtained statistical result on the display unit.

In the mobile body system according to the present invention, the control apparatus further includes a display control part for displaying on the display unit the photographed image represented by the image data simultaneously with the map.

In the mobile body system according to the present invention, the display control part divides a screen on the display unit, displays the map on one part of the divided screen on the display unit and displays the photographed image on another part of the divided screen.

In the mobile body system according to the present invention, the display control part displays on the display unit the photographed image simultaneously with the map, when the event detecting part detects the occurrence of the event.

In the mobile body system according to the present invention, the event detecting part detects a change in a state of the mobile body as an event, based on the state information.

In the mobile body system according to the present invention, the event detecting part detects as an event that the mobile body fails to pass a part of a predetermined route. The control apparatus further includes a route generating part for generating a route for detouring around a specific part of the predetermined route, when the number of occurrences of events that the mobile body fails to pass the specific part is a predetermined number or more.

In the mobile body system according to the present invention, the control apparatus further includes an event displaying part for displaying on the display unit an image indicating the occurrence of the event, when the event detecting part detects the occurrence of the event.

A control apparatus according to the present invention for controlling a mobile body performing photography, comprising: a receiving part for receiving from the mobile body image data representing a photographed image and a state information indicating a state of the mobile body; a display unit for displaying a map including a moving range of the mobile body; an event detecting part for detecting that a specific event occurs to the mobile body, based on the received image data or the received state information; a location detecting part for detecting a location of the mobile body at the time of the occurrence of the event, based on the state information; and a marker displaying part for displaying on the display unit a marker indicating the location detected by the location detecting part on the map.

The control apparatus according to the present invention, further comprising an event displaying part for displaying on the display unit an image indicating the occurrence of the event, when the event detecting part detects the occurrence of the event.

In the present invention, the place of past event is recorded on the map displayed on the control apparatus. The present invention thereby provides excellent effects including facilitating grasp of the place where an event occurs to take preventive measures.

The above and further objects and features of the invention will more fully be apparent from the following detailed description with accompanying drawings.

BRIEF DESCRIPTION OF THE DRAWINGS

FIG. 7 is a schematic diagram illustrating an example of a marker displayed on the display unit according to Embodiment 1;

DETAILED DESCRIPTION

The present invention will be described specifically below with reference to the drawings illustrating the embodiments thereof.

Embodiment 1

Figure 1:
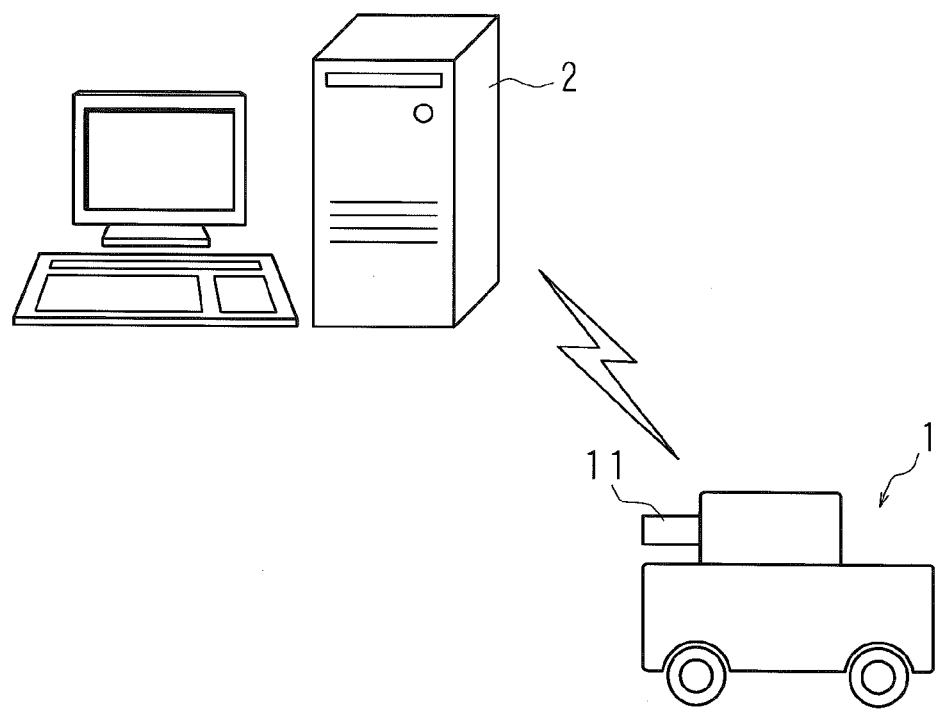
FIG. 1 is a schematic diagram illustrating a mobile body system according to Embodiment 1.

FIG. 1 is a schematic diagram illustrating a mobile body system according to Embodiment 1. The mobile body system includes a mobile body 1 and a control apparatus 2 that controls the mobile body 1. The mobile body system is designed for watching a predetermined area such as a specific building facility or site using the mobile body 1. The mobile body 1 is a vehicle equipped with a moving mechanism, such as a wheel and a motor, and travelling autonomously on the ground. The mobile body 1 is also equipped with a camera 11, which corresponds to a photographing unit of the present invention. The control apparatus 2 is constituted by a computer and controls the mobile body 1. The mobile body 1 is designed to be capable of communicating with the control apparatus 2. The communication is performed via a wireless and/or wired communication network (not shown). The mobile body 1 transmits image data representing the image photographed with the camera 11 to the control apparatus 2. The area is watched through the image data received by the control apparatus 2.

The communication network used herein may be a public communication network such as the Internet or a dedicated communication network to which only limited devices are allowed to connect. Wireless transmission systems compliant with a variety of standards, such as Wi-Fi (registered trademark), ZigBee (registered trademark), Bluetooth (registered trademark) Low Energy (LE), or wireless local area network (LAN) of other types may be used. Alternatively, a cellular network may be used. For the wireless transmission system, authentication may be or may not be. The suitable wireless transmission system, including combination of different ones depending on the situation, can be selected in consideration of the radio transmission range distance or transmission band thereof.

Figure 2:
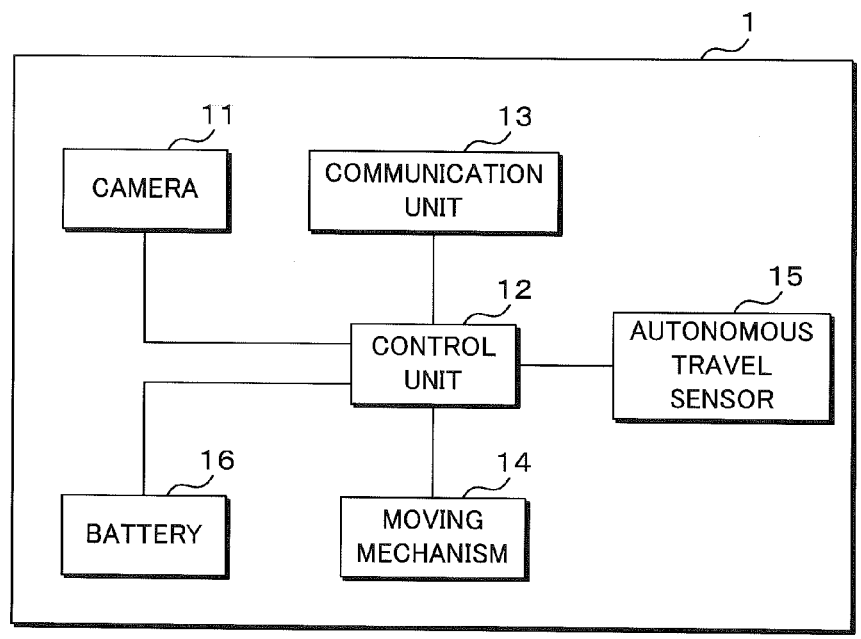
FIG. 2 is a block diagram illustrating functional components inside the mobile body.

FIG. 2 is a block diagram illustrating functional components inside the mobile body 1. The mobile body 1 comprises the camera 11, a control unit 12 for controlling the mobile body 1, a communication unit 13 for communicating with the control apparatus 2, the moving mechanism 14 for moving the mobile body 1, an autonomous travel sensor 15 required for autonomous travel of the mobile body 1, and a battery 16. The moving mechanism 14 includes a wheel, a motor and so forth. The autonomous travel sensor 15 includes a GPS processing unit for receiving signals from Global Positioning System (GPS) satellites to measure the position of the mobile body 1, an inertial measurement unit (IMU) for measuring the acceleration and angular velocity of the mobile body 1, an encoder for measuring the travel distance, a clock unit for measuring the time, and so forth. The autonomous travel sensor 15 may employ other currently used satellite positioning systems similar to GPS, including, for example, Japanese Quasi-Zenith Satellite System (QZSS), Russian Global Navigation Satellite System (GLONASS), EU Galileo System, Chinese BeiDou Navigation Satellite System, and Indian Regional Navigation Satellite System (IRNSS).

The control unit 12 includes a processing unit for performing arithmetic processing and a memory. The camera 11, the communication unit 13, the moving mechanism 14, the autonomous travel sensor 15 and the battery 16 are connected to the control unit 12. The control unit 12 specifies the location and pose of the mobile body 1 based on the data measured with the autonomous travel sensor 15 and controls the moving mechanism 14 so as to move the mobile body 1 along the route according to the information received via the communication unit 13. The battery 16 supplies electricity to each functional element of the mobile body 1. The battery 16 supplies electricity mainly for performing the functions of the mobile body 1 of travelling, measuring the travel distance, perceiving the instructions from the control apparatus 2, and communicating. The battery 16 employs, for example, a rechargeable battery, such as a lithium-ion battery, a nickel-metal hydride battery, a nickel-cadmium battery or a lead battery, or various fuel cell batteries. An example in which the battery 16 is a rechargeable battery is described in the present embodiment.

Figure 3:
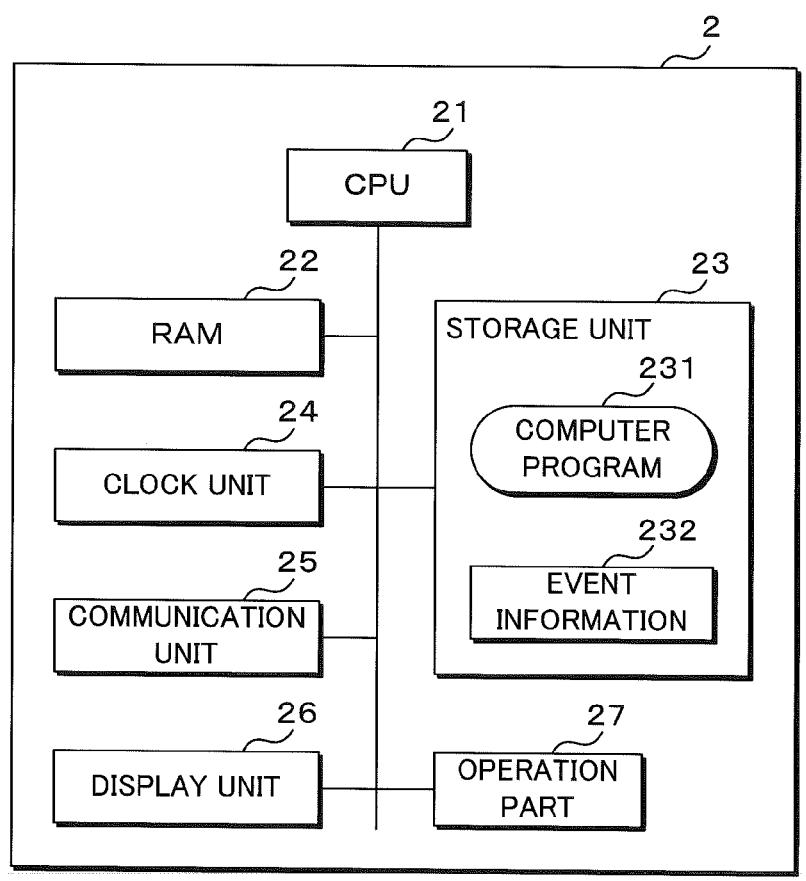
FIG. 3 is a block diagram illustrating functional components inside a control apparatus.

FIG. 3 is a block diagram illustrating functional components inside the control apparatus 2. The control apparatus 2 comprises a central processing unit (CPU) 21 for performing arithmetic processing, a random access memory (RAM) 22, a nonvolatile storage unit 23, a clock unit 24, a communication unit 25 for communication with the mobile body 1, a display unit 26 for display of an image, and an operation part 27 such as a keyboard for receiving the user's operation. In the storage unit 23, a computer program 231 is stored. The CPU 21 loads the computer program 231 to the RAM 22 and executes a process according to the computer program 231, if necessary. The storage unit 23 is a hard disk drive and the display unit 26 is a liquid crystal display, for example.

The CPU 21 calculates the future route of the mobile body 1 with reference to the location of the mobile body 1 indicated by the information received via the communication unit 25. The communication unit 25 transmits the information indicating the calculated route to the mobile body 1. The mobile body 1 receives the information indicating the route via the communication unit 13. The control unit 12 determines the position of the mobile body 1 at any time based on the measurement result from the autonomous travel sensor 15 and controls the moving mechanism 14 so as to move the mobile body 1 along the route indicated in the received information. Alternatively, the control apparatus 2 may transmit the information indicating a predetermined route prestored in the storage unit 23 to the mobile body 1 and the mobile body 1 may move along the route indicated in the received information. Furthermore, the mobile body 1 may store the information indicating a predetermined route therein and move along the predetermined route.

The mobile body 1 photographs the outside with the camera 11 while moving. The communication unit 13 transmits image data representing the image photographed with the camera 11 to the control apparatus 2. In addition, the control unit 12 generates the state information indicating the state of the mobile body 1, such as the location, the velocity and pose that are specified based on the measurement results from the autonomous travel sensor 15, the remaining capacity of the battery 16 specified based on the output voltage of the battery 16, and the like. The state information is transmitted to the control apparatus 2 by the communication unit 13. The control apparatus 2 receives the image data and the state information via the communication unit 25.

Figure 4:
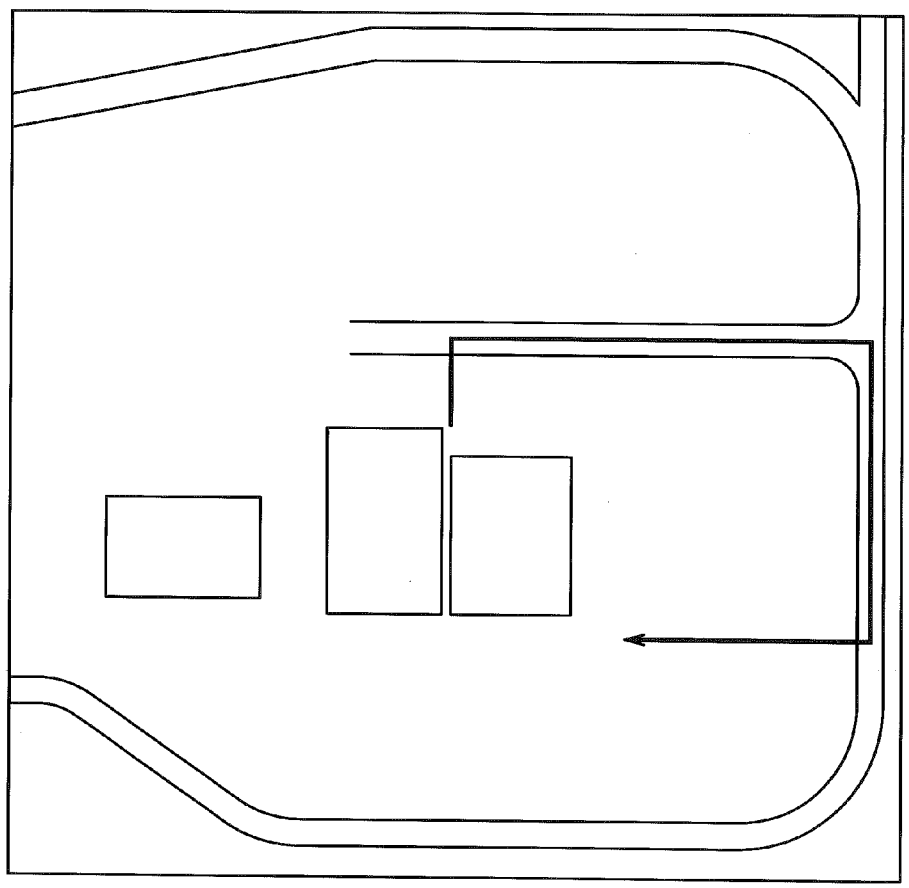
FIG. 4 is a schematic diagram illustrating an example of a map displayed on a display unit according to Embodiment 1.

The control apparatus 2 displays the map including the moving range of the mobile body 1 on the display unit 26. A map data is prestored in the storage unit 23 and the CPU 21 displays the map on the display unit 26 based on the stored map data. FIG. 4 is a schematic diagram illustrating an example of the map displayed on the display unit 26 according to Embodiment 1. The map illustrating positions of buildings and roads in a plan view is displayed. While the outdoor map is presented in FIG. 4, an indoor map is displayed when the mobile body 1 moves indoors. A photo may be displayed as the map. In addition, the CPU 21 displays the route of the mobile body 1 on the display unit 26 by overlaying the route on the map. Specifically, the CPU 21 executes a process for generating an image of the map on which the route is overlaid and displaying the generated image on the display unit 26. The route of the mobile body 1 is represented by an arrow in FIG. 4. The user sees the content displayed on the display unit 26 to check the route of the mobile body 1. Additionally, the CPU 21 may display the image indicating the location of the mobile body 1 over the map on the display unit 26. For example, the arrow head represents the position of the mobile body 1 in FIG. 4.

Figure 5:
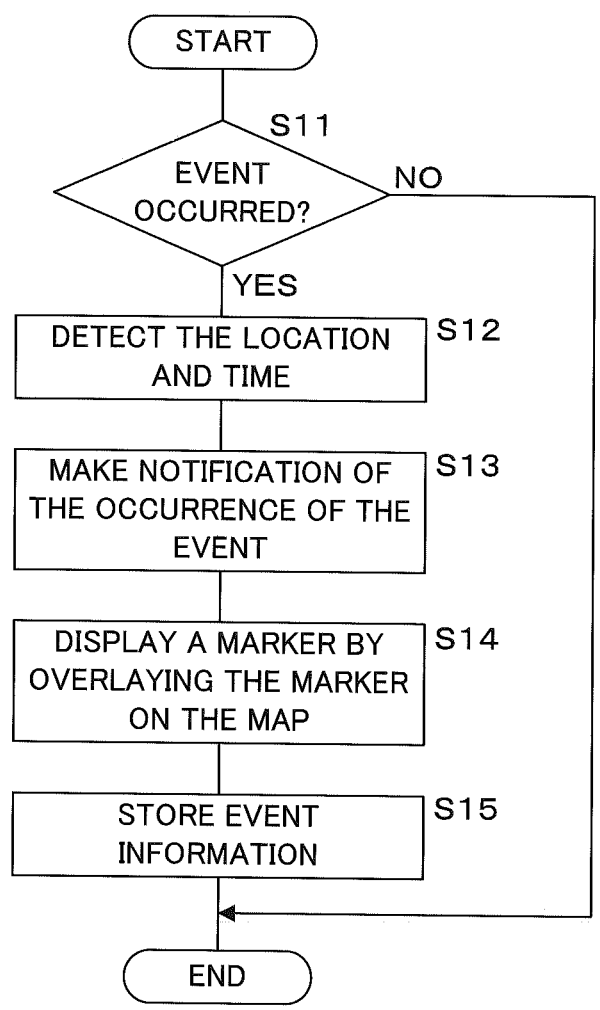
FIG. 5 is a flow chart illustrating a procedure processed by the control apparatus when an event occurs.

In addition, the control apparatus 2 detects the occurrence of specific events, such as finding of an intruder, a state change of the mobile body 1, or the failure of mobile body 1 passing through a part of the predetermined route, and executes a process for recording the occurrence of the event. FIG. 5 is a flow chart illustrating a procedure processed by the control apparatus 2 when an event occurs. The CPU 21 executes the following processes according to the computer program 231. The CPU 21 determines whether a specific event occurs to the mobile body 1 at any time based on the image data and the state information received by the communication unit 25 from the mobile body 1 (S11).

For example, the CPU 21 determines whether a person is present in the image represented by the received image data. If a person is present in the image, the CPU 21 determines that an event of finding of an intruder has occurred. The image represented by the received image data is the image photographed by the mobile body 1 with the camera 11. If the moving range of the mobile body 1 is an off-limit area, it is determined that an intruder is found when a person is present in the image photographed by the mobile body 1. Additionally, for example, the information about people who are admitted to the moving range of the mobile body 1 is prestored in the storage unit 23, so that the CPU 21 determines whether the person in the image has the admission, by referring to the information stored in the storage unit 23, and then determines that an event of finding an intruder has occurred if the person has no admission. Moreover, for example, the information about people who should be considered as an intruder is prestored in the storage unit 23, so that the CPU 21 determines whether the person in the image is the one who should be considered as an intruder, by referring to the information stored in the storage unit 23, and then determines that an event of finding an intruder has occurred if the person is the one who should be considered as an intruder. The process for finding an intruder may be executed by the control unit 12 of the mobile body 1. In such an embodiment, the communication unit 13 transmits to the control apparatus 2 the information indicating the finding of an intruder, and then when the control apparatus 2 receives the information via the communication unit 25, the CPU 21 determines that an event of finding of an intruder has occurred.

In addition, the CPU 21 determines based on the state information from the mobile body 1 whether such an event that the state of the mobile body 1 is changed to a specific state has occurred. The change to the specific state includes the occurrence of an abnormality in the mobile body 1. For example, the CPU 21 determines whether the remaining capacity of the battery 16 indicated in the received state information is not greater than a predetermined value, and when the remaining capacity is not greater than the predetermined value, the CPU 21 determines that an event of decrease in the remaining capacity of the battery 16 has occurred. Additionally, for example, the mobile body 1 transmits to the control apparatus 2 the state information including the information indicating the output voltage of the battery 16, and then the CPU 21 calculates the remaining capacity of the battery 16 from the output voltage indicated in the state information to determine whether the calculated remaining capacity is not greater than the predetermined value. When the remaining capacity of the battery 16 is not greater than the predetermined value, the CPU 21 determines that the event of the decrease in the remaining capacity of the battery 16 has occurred. The process of determining whether the remaining capacity of the battery 16 is not greater than the predetermined value may be executed by the control unit 12 of the mobile body 1. In such an embodiment, the communication unit 13 transmits to the control apparatus 2 the state information including the information indicating the determined result, and then the CPU 21 of the control apparatus 2 determines whether the event has occurred, according to the received information. In addition, for example, if the state information includes the temperature inside the mobile body 1, the CPU 21 determines whether the temperature indicated in the state information is not lower than a predetermined value. If the temperature is not lower than the predetermined value, the CPU 21 determines that an event of abnormal rising of the temperature in the mobile body 1 has occurred. In addition, for example, if the velocity indicated in the state information is not greater than a predetermined value, the CPU 21 determines that an event of abnormal deceleration or stop has occurred. In addition, for example, the mobile body 1 has a function of detecting abnormalities such as a rise in temperature over a prescribed value, a blowout of the tire of the wheel, malfunction in each part, and turning over, the communication unit 13 transmits the state information including the information indicating the occurrence of such an abnormality, and the CPU 21 of the control apparatus 2 determines based on the received state information whether the event of the abnormality in the mobile body 1 has occurred.

In addition, for example, the CPU 21 compares the location of the mobile body 1 indicated in the received state information with the predetermined route of the mobile body 1, to determine whether the event that the mobile body 1 fails to pass a part of the predetermined route has occurred. For example, if the distance between the point closest to the mobile body 1 on the predetermined route and the location of the mobile body 1 become equal to or greater than a predetermined distance, the CPU 21 determines that the event that the mobile body 1 fails to pass a part of the predetermined route has occurred. For example, if the mobile body 1 stops at some point on the predetermined route, the CPU 21 determines that the event that the mobile body 1 fails to pass along the remaining part of the route. For example, if the mobile body 1 deviated at a point from the predetermined route with a distance greater than a predetermined distance, the CPU 21 determines that the event that the mobile body 1 fails to pass along the remaining part of the route from the point of the deviation has occurred. The process of determining whether the event that the mobile body fails to pass a part of the predetermined route has occurred may be executed by the control unit 12 of the mobile body 1. In such an embodiment, the communication unit 13 transmits to the control apparatus 2 the information including the determined result and the CPU 21 of the control apparatus 2 determines whether the event has occurred, according to the received state information.

When no event occurs (S11: NO), the CPU 21 terminates the process. When the CPU 21 detects an occurrence of an event (S11: YES), the CPU 21 detects the location and time of the mobile body 1 at the time of occurrence of the event (S12). At S12, the CPU 21 detects the location of the mobile body 1 by obtaining the location of the mobile body 1 indicated in the state information which has received when determining the occurrence of the event. In addition, the CPU 21 detects the time by obtaining the time the clock unit 24 measured when the CPU 21 determines the occurrence of the event. Alternatively, the CPU 21 may detect the location of the mobile body 1 by calculating the location based on the calculated route of the mobile body 1. Furthermore, the CPU 21 may detect the location of the mobile body 1 by calculating the location based on the state information including the velocity, etc. of the mobile body 1. In addition, the CPU 21 may detect the time by obtaining the time indicated in the received state information.

Figure 6:
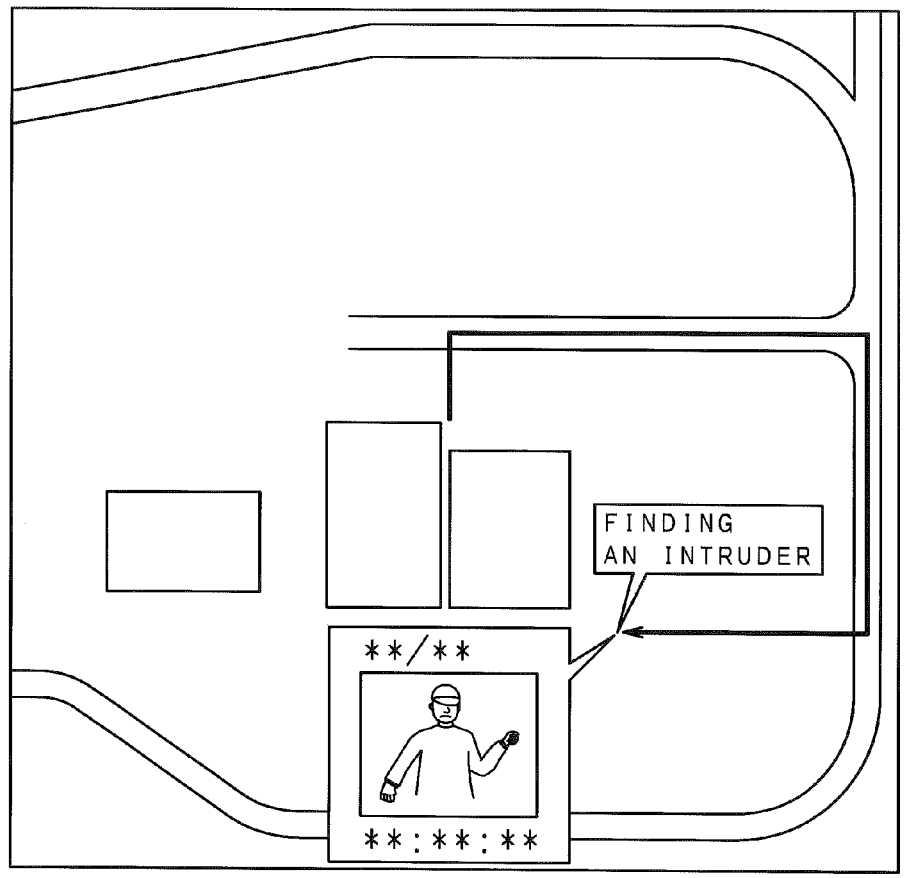
FIG. 6 is a schematic diagram illustrating an example of display on the display unit according to Embodiment 1 at the time of an occurrence of an event.

The CPU 21 then makes notification of the occurrence of the event by displaying on the display unit 26 an image which indicates the occurrence of the event (S13). FIG. 6 is a schematic diagram illustrating an example of display on the display unit 26 according to Embodiment 1 at the time of an occurrence of an event. The image indicating the details of the event that has occurred by characters is overlaid on the map to be displayed. In addition, the image photographed at the time of the occurrence of the event with the camera 11 of the mobile body 1, the date and the detected time are overlaid on the map to be displayed. FIG. 6 illustrates an example of display at the time of finding an intruder. Characters for notifying the user of the finding of an intruder and a photographed image of the intruder are displayed. At S13, the CPU 21 executes the process for generating the image by overlaying, on the map and the route of the mobile body 1, the characters describing the details of the event, the photographed image and the date and time, and for displaying the generated image on the display unit 26. The data representing the characters describing the details of the event is prestored in the storage unit 23 in association with the details of the event. The CPU 21 reads out the necessary data from the storage unit 23 according the details of the event, and generates the image. The photographed image is thereby displayed simultaneously with the map. The CPU 21 thus functions as the display control unit of the present invention. The notification of the details of the event as illustrated in FIG. 6 is erased, when the user inputs the instruction for erasing by operating the operation part 27 or after a predetermined time has passed. In response to the instruction, the CPU 21 displays on the display unit 26 the image on which the notification has been erased. Alternatively, the CPU 21 may display on the display unit 26 an image that indicates the details of the event by an illustration or a symbol other than characters or an image that only indicates the occurrence of the event.

The CPU 21 then displays on the display unit 26 a marker that indicates the location of the event on the map, by overlaying the marker on the map (S14). At S14, the CPU 21 executes the process for generating the image by overlaying a marker with a predetermined shape on the map at the location detected at S12 and for displaying the generated image on the display unit 26. FIG. 7 is a schematic diagram illustrating an example of a marker displayed on the display unit 26 according to Embodiment 1. At the position where an event has occurred on the map, a star-shaped marker 31 is displayed. The location of the event is indicated on the map by the marker 31. The marker 31 remains displayed without being erased while being overlaid on the map. Because the marker 31 remains displayed over the map, the user who sees the map displayed on the display unit 26 can perceive that an event has occurred in the past. Because the marker 31 is displayed at the position where the event has occurred on the map, the user can easily perceive where the event has occurred. In addition, because the marker 31 is displayed with the route of the mobile body 1, the user can easily perceive which location on the route of the mobile body 1 the event has occurred.

The CPU 21 then stores event information 232 that indicates the details of the event, the location and the time of the occurrence of the event in the storage unit 23 (S15) and then terminates the process. The event information 232 may include the image data representing the image photographed with the camera 11 of the mobile body 1 at the time of the occurrence of the event. The CPU 21 repeats the processes of S11 to S15 if necessary. For example, the CPU 21 repeats the processes of S11 to S15 whenever the communication unit 25 receives the image data and the state information from the mobile body 1.

As the CPU 21 executes the processes of S11 to S15, the marker 31 is displayed over the map 31 whenever an event occurs and remains displayed. For example, after multiple events have occurred, the display unit 26 displays the map on which multiple markers 31 are overlaid. Accordingly, the history of the past events is recorded on the map. The user can easily check where events occurred in the past by viewing the map. In addition, the CPU 21 generates a marker 31 according to the details of an event at S14. In other words, markers 31 which are different in appearances such as the shape, color or size depending on the details of the event are displayed over the map.

Figure 8:
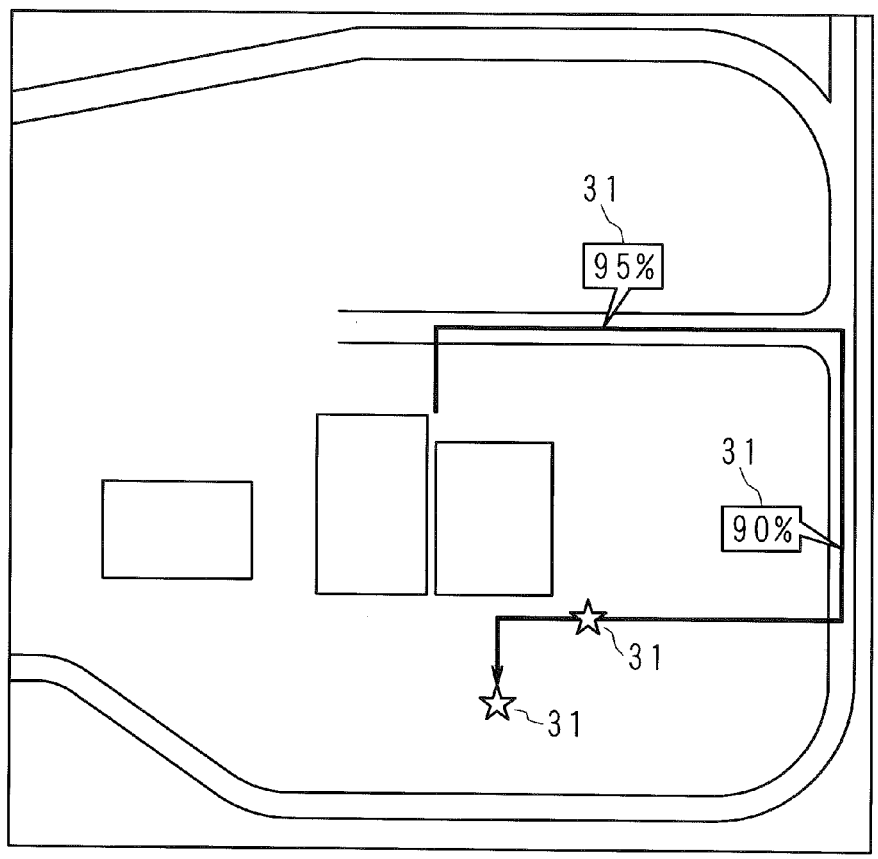
FIG. 8 is a schematic diagram illustrating an example of a map on which multiple markers are overlaid according to Embodiment 1.

FIG. 8 is a schematic diagram illustrating an example of a map on which multiple markers 31 according to Embodiment 1 are overlaid. The star-shaped markers 31 are overlaid at two locations on the map. Each star-shaped marker 31 corresponds to the event of finding an intruder. The user can perceive that intruders are found in two locations by viewing the displayed map. In addition, markers 31 including the values represented by % as a unit are overlaid at two locations on the map. Each of such markers 31 corresponds to the event that the remaining capacity of the battery 16 of the mobile body 1 decreases to a predetermined value or less. The marker 31 including the value "95%" indicates that the remaining capacity of the battery 16 has decreased to 95% or less at the position shown on the map by the marker 31, and the marker 31 including the value "90%" indicates that the remaining capacity of the battery 16 has decreased to 90% or less at the position shown on the map by the marker 31. The user can conjecture the current remaining capacity of the battery 16 by checking such markers 31. For example, it enables the user to give the mobile body 1 an instruction to return for charging when the remaining capacity of the battery 16 decreases by some degree. In addition, the CPU 21 may change the color of the route of the mobile body 1 displayed on the display unit 26 according to the remaining capacity of the battery 16. For example, the color of the route may be set to green when the remaining capacity is more than 50%, yellow when between 30% and 50%, and red when 30% or below. By changing the color of the route according to the remaining capacity of the battery 16, the user is facilitated to conjecture the remaining capacity of the battery 16 of the mobile body 1. In addition, the mobile body 1 can easily be retrieved when the event of an abnormality in the mobile body 1 occurs, because the location of the event is made apparent by the marker 31.

The details of the event information 232 can be checked later. For example, when the user designates the marker 31 on the map by operating the operation part 27, the CPU 21 displays on the display unit 26 the details of the event information 232 related to the marker 31 designated. For example, the details of the event information 232 related to the event that occurred at the location indicated by the marker 31 on the map is displayed. Based on the event information 232, the image photographed with the camera 11 of the mobile body 1 at the time of the occurrence of the event may be displayed. The details of the event, the location and the time of the occurrence of the event can thereby be checked. In addition, the event information 232 stored in the storage unit 23 can be output to another computer.

The history of the occurrences of the events recorded on the map displayed on the display unit 26 and the event information 232 stored in the storage unit 23 may be helpful for taking preventive measures against occurrence of the events. For example, the mobile body system may be improved based on the record of the state changes of the mobile body 1. More specifically, based on the history of the remaining capacity of the battery 16, the route of the mobile body 1 can be determined appropriately so that the mobile body 1 can move with sufficient remaining capacity of the battery 16. Based on the record of abnormalities in the temperature information or the likes of the mobile body 1, the appropriate maintenance of the mobile body 1 and repair of roads can be performed to restrain the occurrence of an abnormality. In addition, for example, the facility can be improved to prevent an intruder, by installing a fence or a notice for claiming an off-limit area at the location where an intruder has actually been found. In addition, for example, the route of the mobile body 1 can be improved to enable the mobile body 1 to patrol the area where intruders are found frequently.

Figure 9:
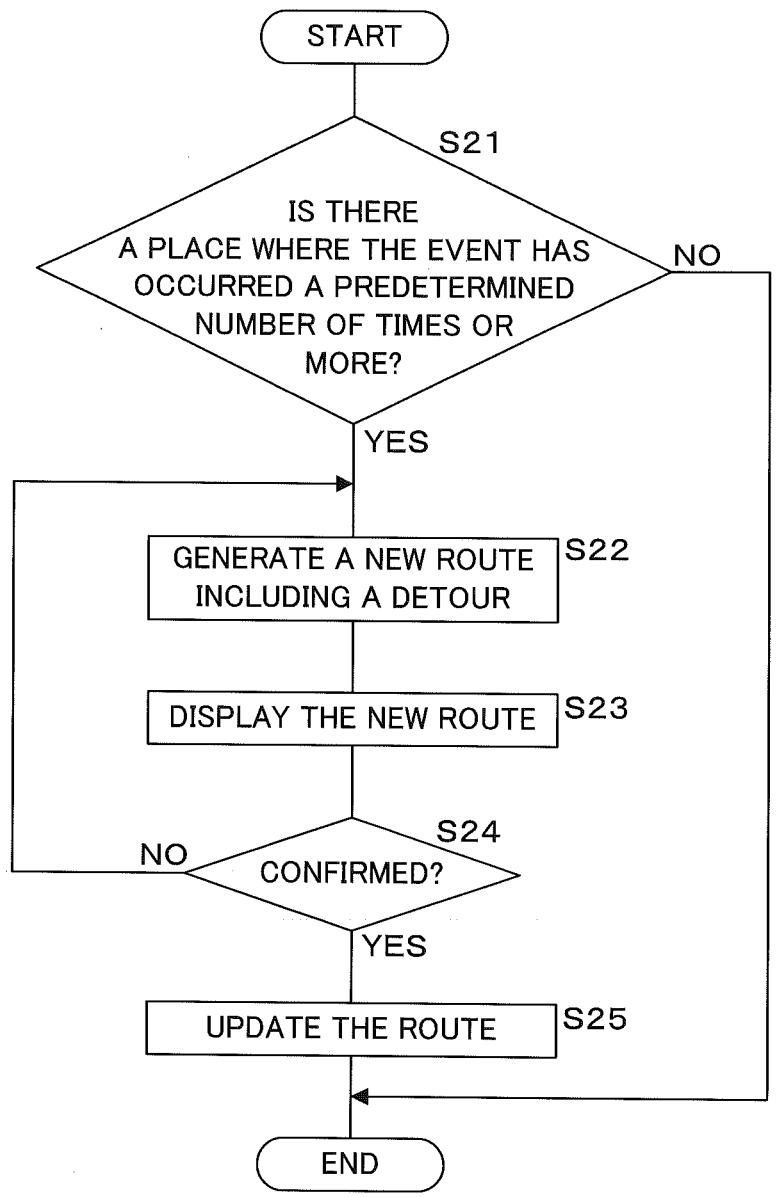
FIG. 9 is a flowchart of a procedure processed by the control apparatus for generating a new route.

In addition, the control apparatus 2 executes the process for automatically generating a new route, based on the record of the event that the mobile body 1 fails to pass a part of the predetermined route. FIG. 9 is a flowchart of a procedure performed by the control apparatus 2 for generating a new route. The CPU 21 determines, based on the event information 232 stored in the storage unit 23, whether there is a place where the event that the mobile body 1 fails to pass through has occurred a predetermined number of times or more on the predetermined route (S21). If the event that the mobile body 1 fails to pass the predetermined place has occurred multiple times and the distance between the places of such events is within a predetermined range, the CPU 21 counts the number of occurrences of the events as the events have occurred at the same place. When there is no place where the event has occurred a predetermined number of times or more (S21: NO), the CPU 21 terminates the process. If there is a place where the event has occurred a predetermined number of times or more (S21: YES), the CPU 21 generates a new route including a detour for detouring around the place (S22). For example, multiple routes on which the mobile body 1 can move are prestored in the storage unit 23, and the CPU 21 selects from the multiple routes one route that includes a detour which is distant with a predetermined distance or more from the place where the event has occurred multiple times. Alternatively, for example, the data indicating the positions of multiple nodes may be stored in the storage unit 23, and the CPU 21 may execute a process for generating a route by linking the nodes for detouring around the place where the event has occurred multiple times. The CPU 21 then overlays the new route on the map and display it on the display unit 26 (S23). At S23, the CPU 21 executes a process for generating an image by overlaying the new route on the map and for displaying the generated image on the display unit 26.

Figure 10:
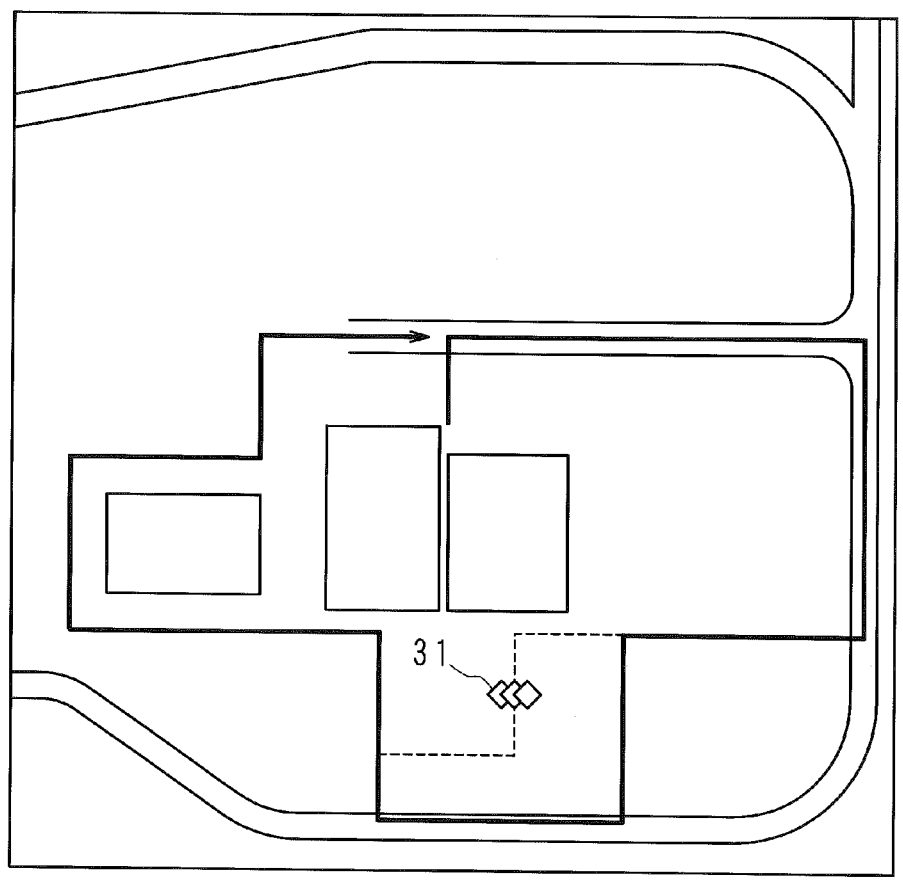
FIG. 10 is a schematic diagram illustrating an example of display of a new route.

FIG. 10 is a schematic diagram illustrating an example of display of a new route. In the figure, the new route is represented by a solid line with an arrow head and a part of the original route different from the new route is represented by a dashed line. The diamond-shaped marker 31 corresponds to the event that the mobile body 1 fails to pass a part of the predetermined route. The new route for detouring around the place where the event that the mobile body 1 fails to pass has occurred multiple times is displayed. The user checks the displayed new route and inputs an instruction to confirm the route by operating the operation part 27. The CPU 21 waits for the input of the instruction for confirming the route (S24). When no instruction for confirming the route is input (S24: NO), the CPU 21 returns the process to S22. When the CPU 21 receives the input for confirming the route (S24: YES), the CPU 21 updates the route to be taken by the mobile body 1 to the generated new route (S25) and then terminates the process. At S25, the data indicating the updated route is stored in the storage unit 23. The control apparatus 2 executes the process of S21 to S25 periodically, for example. By executing the process of S21 to S25, when the event that the mobile body 1 fails to move along the predetermined route occurs frequently at the same place, the control apparatus 2 proposes a new route for detouring around the place of the event. As described above, the route of the mobile body 1 can be improved to prevent diversion of the actual route of the mobile body 1 from the determined route. In addition, based on the details of the event information 23, it may also be possible to improve the facility by removing the cause of the failure in moving of the mobile body 1, for example by removing an obstacle or fixing a damaged road, at the place where the event that the mobile body 1 fails to move along the predetermined route.

As described above, the present embodiment facilitates to grasp the location where an event such as finding of an intruder occurs to make preventive measures for the event. Therefore, security can be improved with respect to a target monitored with the mobile body system.

The mobile body system may be embodied in comprising multiple mobile bodies 1. In such an embodiment, the control apparatus 2 communicates with the multiple mobile bodies 1. The routes of the multiple mobile bodies 1 may be displayed over the map on the display unit 26, for example. Alternatively, the multiple mobile bodies 1 may move along the same route, for example.

Embodiments 2

Figure 11:
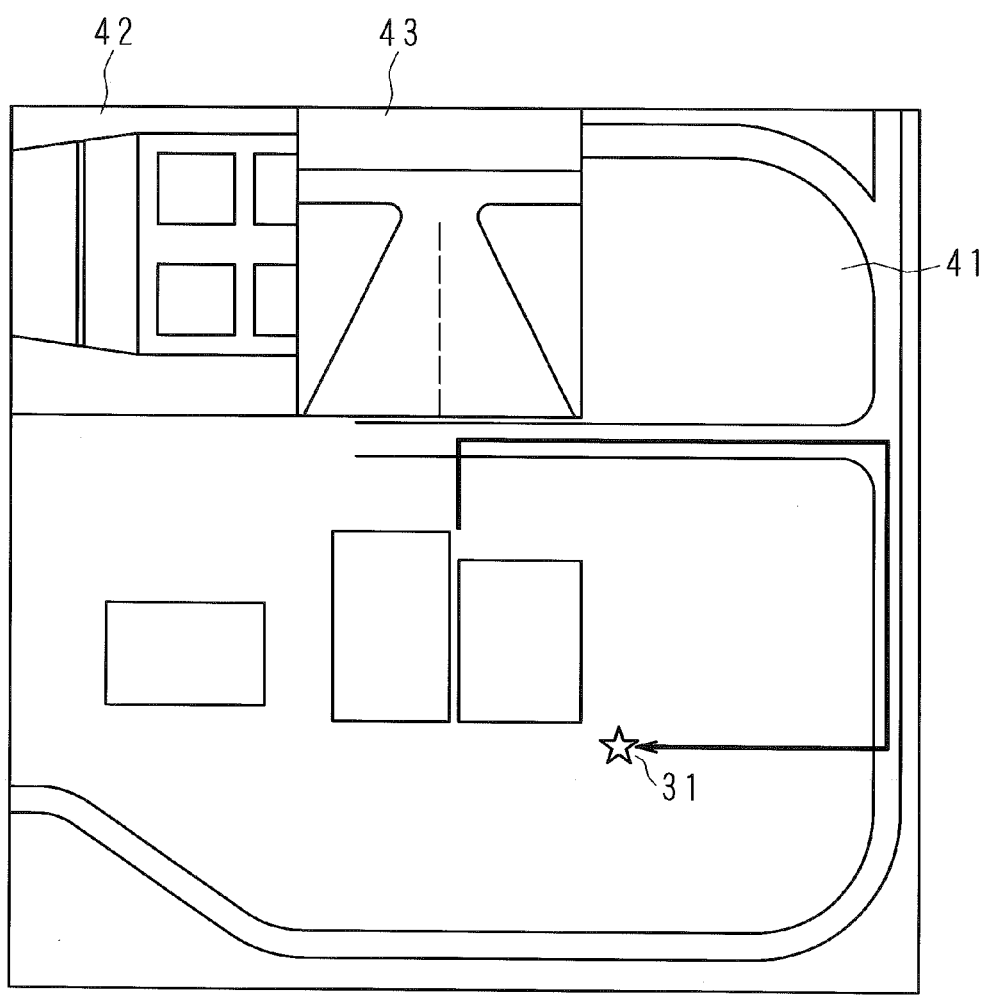
FIG. 11 is a schematic diagram illustrating an example of display on a display unit according to Embodiment 2.

The functional components inside the mobile body 1 and the control apparatus 2 according to Embodiment 2 are similar to those in Embodiment 1. FIG. 11 is a schematic diagram illustrating an example of display on the display unit 26 according to Embodiment 2. The entire screen on the display unit 26 is divided into multiple partial screens. The CPU 21 divides the entire screen on the display unit 26 and displays the map on some of the partial screens in the display unit 26 and the image(s) photographed with the camera 11 of the mobile body 1 on the rest of the partial screens. Specifically, the CPU 21 executes a process for generating an image by combining the photographed image represented by the image data received by the communication unit 25 with the map and for displaying the generated image on the display unit 26. FIG. 11 illustrates an example of display in which the entire screen is divided into the first screen 41, the second screen 42 and the third screen 43, where a map is displayed on the first screen while the photographed images are displayed on the second screen 42 and the third screen 43. For example, the mobile body system 1 comprises two mobile bodies 1, where the image photographed by one mobile body 1 is displayed on the second screen 42 and the image photographed by the other mobile body 1 is displayed on the third screen 43.

The control apparatus 2 executes the process similar to that in Embodiment 1. In other words, on the first screen 41 in the display unit 26, the route of the mobile body 1 is displayed over the map, and the marker 31 is added to be displayed over the map whenever an event occurs. In addition, the CPU 21 executes, simultaneously with the process in the Embodiment 1, a process for displaying the images photographed with the cameras 11 of the mobile bodies 1 on the second screen 42 and the third screen 43 in the display unit 26 in real time. The user monitors the photographed images displayed on the second screen 42 and the third screen 43 as well as the map displayed on the first screen 41. As descried above, the CPU 21 functions as the display control unit of the present invention.

Also in the present embodiment, the history of the past events such as finding of an intruder is recorded on the map and the event information 232 is stored in the storage unit 23. Therefore, it facilitates to grasp the location where an event occurs to make preventive measures for the event. Additionally in the present embodiment, the image photographed by the mobile body 1 is displayed simultaneously with the map so that the user can monitor the photographed image. Monitoring the photographed image by the user enables to find an abnormality that cannot be detected as an event. Therefore, the algorithm for detecting an event can be improved, for example.

Additionally, the CPU 21 may execute a process other than displaying photographed images on the second screen 42 and the third screen 43 in real time. The CPU 21 may display the images that have been photographed with the cameras 11 of the mobile bodies 1 at the time of the occurrence of the event on the second screen 42 and the third screen 43 in the display unit 26. For example, the images relating to the events that are different from each other in details may be displayed on the second screen 42 and the third screen 43 respectively. The user can easily grasp the situation at the time of the occurrence of the event through the photographed image relating to the event. In addition, for example, the image data transmitted sequentially from the mobile body 1 may be stored in order in the storage unit 23, and based on the stored image data the CPU 21 may display the image photographed in the past with the camera 11 of the mobile body 1 on the second screen 42 or the third screen 43 in the display unit 26. Displaying the past photographed images enables the user to re-monitor the place where the user has missed to see the photographed image therefor. In addition, it is possible to simultaneously display multiple photographed images which are different in the time of photographing, such as displaying a real time image on the second screen 42 and the past image on the third screen 43. The user thus can compare the images for finding an abnormality. In addition, for example, the mobile body system 1 may comprise, in addition to the camera 11 in the mobile body 1, an additional fixed camera that is fixed to a predetermined location, and the CPU 21 may display the image photographed with the fixed camera on the second screen 42 or the third screen 43 in the display unit 26. The image photographed with the fixed camera is always displayed so that the user can always monitor an important place simultaneously with monitoring using the mobile body 1.

Embodiment 3

Figure 12:
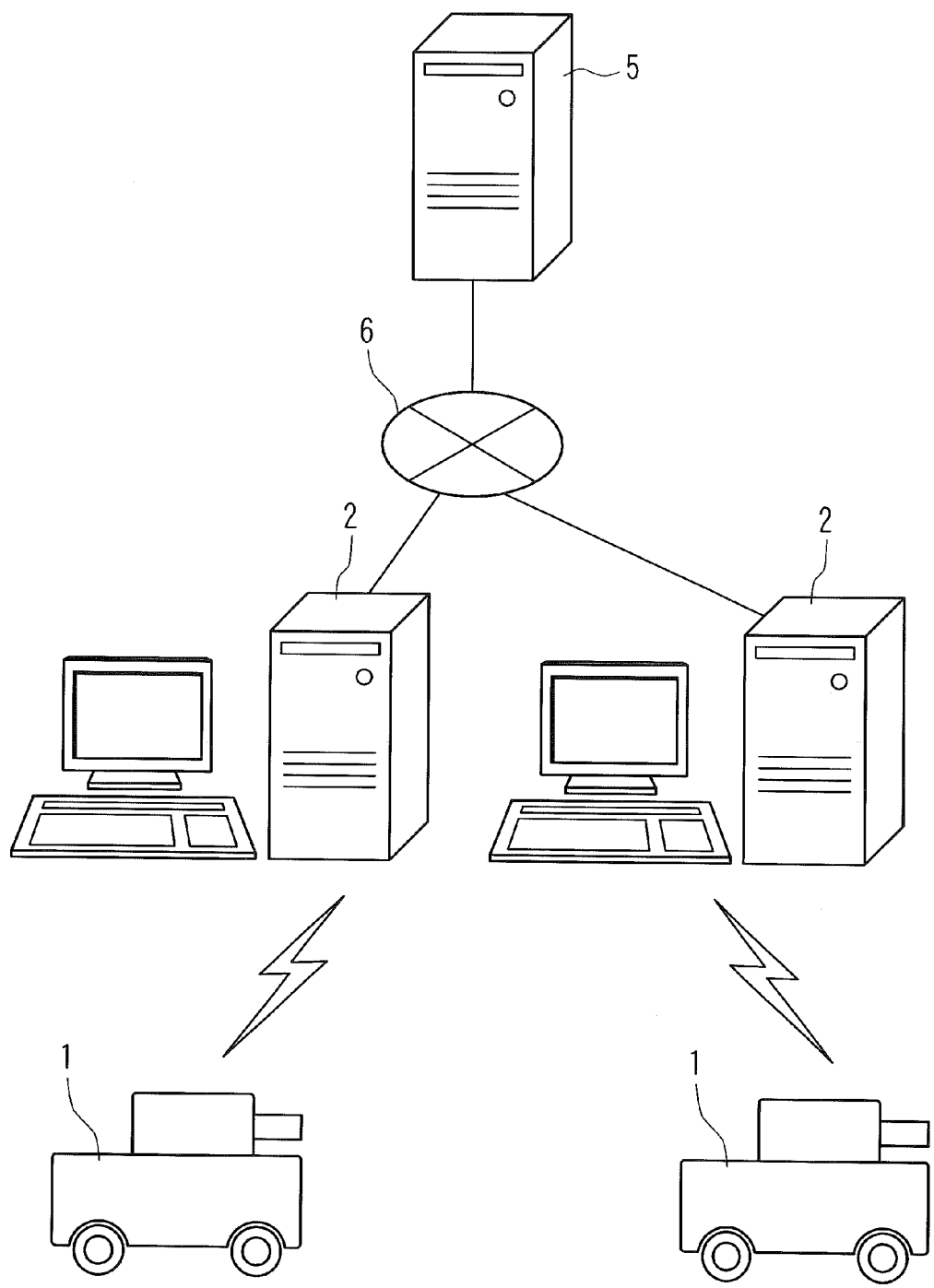
FIG. 12 is a schematic diagram illustrating a mobile body system according to Embodiment 3.

FIG. 12 is a schematic diagram illustrating a mobile body system according to Embodiment 3. In Embodiment 3, the mobile body system comprises multiple control apparatuses 2. Each control apparatus 2 controls one or multiple mobile bodies 1. Each control apparatus 2 controls the mobile body 1 with a different moving range. The different areas are monitored using the mobile bodies 1 controlled by the different control apparatuses 2. In addition, each control apparatus 2 is connected to a communication network 6, to which a storage apparatus 5 is connected. The functional components inside the mobile body 1 and the control apparatus 2 according to Embodiment 3 are similar to those in Embodiment 1, except that the communication unit 25 in the control apparatus 2 is connected to the communication network 6 and communicates with the storage apparatus 5 via the communication network 6, in addition to communicating with the mobile body 1. FIG. 12 illustrates an example of the mobile body system comprising two control apparatuses 2. The mobile body system 2 may comprise three or more control apparatuses 2.

Figure 13:
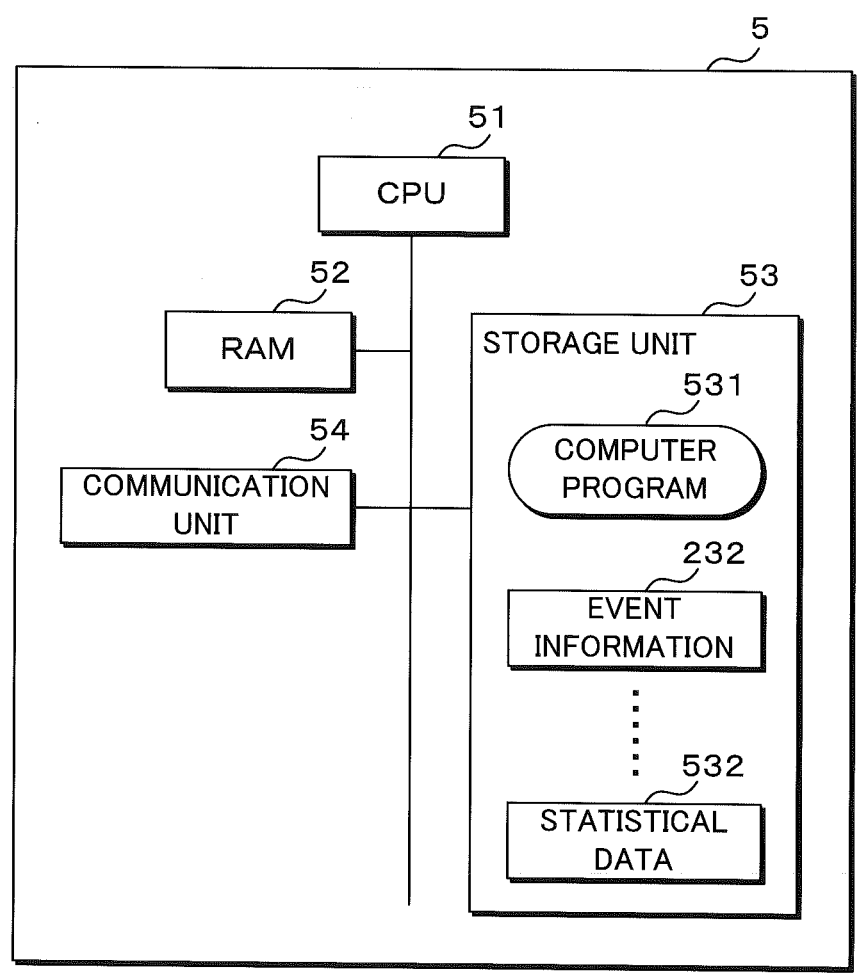
FIG. 13 is a block diagram illustrating functional components inside a storage apparatus.

FIG. 13 is a block diagram illustrating functional components inside the storage apparatus 5. The storage apparatus 5 is constituted by a computer and comprises a CPU 51 for performing arithmetic processing, a RAM 52, a non-volatile storage unit 53 and a communication unit 54. In the storage unit 53, a computer program 531 is stored. The CPU 51 loads the computer program 531 to the RAM 52 and executes a process according to the computer program 231, if necessary. The storage unit 53 is a hard disk drive, for example. The communication unit 54 is connected to the communication network 6 and communicates with multiple control apparatuses 2 via the communication network 6. The storage apparatus 5 may be constituted by multiple computers.

The mobile body 1 and the control apparatus 2 according to the present embodiment execute the processes similar to those in Embodiments 1 and 2. Therefore, also in the present embodiment, the history of the past events such as finding of an intruder is recorded on the map and the event information 232 is stored in the storage unit 23. In addition, the CPU 21 stores in the storage unit 23 the event information 232 including the feature information indicating the features of the place where the event occurs. For example, the feature is a keyword corresponding to the place of the event, among the predetermined multiple keywords that characterize places, such as "on the road," "beside the wall," "in front of the gate" and "the entrance of the building." The CPU 21 controls the communication unit 25 to transmit the event information 232 to the storage apparatus 5, whenever the event information 232 is stored or a predetermined period of time passes. The storage apparatus 5 receives the event information 232 sent from each control apparatus 2 via the communication unit 54 and the CPU 51 stores the received event information 232 in the storage unit 53. As described above, the event information 232 relating to the respective control apparatuses 2 is stored in the storage unit 53. The event information 232 includes the details and the features of the places of events that have occurred in the respective areas under the monitoring using the mobile body 1.

Figure 14:
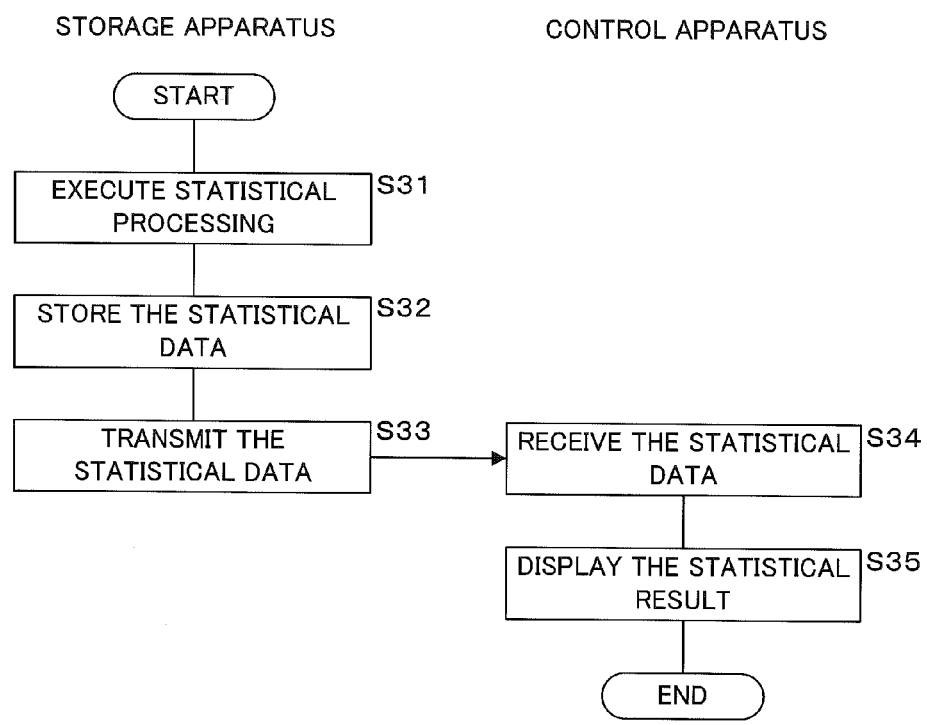
FIG. 14 is a flowchart illustrating procedures of statistical processing and outputting of the statistical result executed by the mobile body system.

The mobile body system according to the present embodiment performs statistical processing for the event information 232 and outputs the statistical results. FIG. 14 is a flowchart illustrating procedures of statistical processing and outputting of the statistical result that are executed by the mobile body system. The CPU 51 of the storage apparatus 5 executes statistical processing for the entire event information 232 relating to multiple control apparatuses 2 and the event information 232 relating to the respective control apparatuses 2, both of which are stored in the storage unit 53 (S31). Specifically, the CPU 51 counts the number of occurrences of events by the event detail, the feature of a place of an event, or the date and time. In addition, the CPU 51 calculates the occurrence rate of an event by the event detail, the feature of a place of an event, or the date and time. The CPU 51 may further execute, based on the calculation result, more detailed statistical processing, such as calculating the variation of the number of occurrences of events or extracting the feature of the place where an event has occurred a predetermined number of times or more. In addition, if a photographed image of an intruder with respect to the event of finding an intruder is included in event information 232, the CPU 51 may execute a process for extracting the image data representing the photographed image from the event information 232. The CPU 51 executes such statistical processing for the entire event information 232 relating to the multiple control apparatuses 2 and for the event information 232 relating to each control apparatus 2. By the statistical processing for the entire event information 232 relating to the multiple control apparatuses 2, the tendency of the events that occur at the whole of the multiple monitored areas can be obtained. By the statistical processing for the event information 232 relating to each control apparatus 2, the feature of the events that occur at each of the multiple monitored areas can be obtained. The CPU 51 may execute statistical processing for only one of the entire event information 232 relating to the multiple control apparatuses 2 and the event information 232 relating to each control apparatus 2.

The CPU 51 then generates statistical data 532 representing the statistical result from the statistical processing in S31 and stores the generated statistical data 532 in the storage unit 53 (S32). The statistical data 532 may include the image data representing the photographed image of an intruder. The CPU 51 then transmits the statistical data 532 to each control apparatus 2 via the communication unit 54 (S33). The statistical data 532 is transmitted to each control apparatus 2 via the communication network 6.

The control apparatus 2 receives the statistical data 532 transmitted from the storage apparatus 5, via the communication unit 54 (S34). Through S34, the control apparatus 2 receives the statistical data 532. The CPU 21 displays the statistical result indicated in the received statistical data 532 on the display unit 26 (S35) and then terminates the process. At S35, the statistical result is displayed as the number of events or the occurrence rate of an event by the detail, the feature of a location of an event, or the date and time, being presented in a table or a graph, for example. The statistical result is displayed about all the areas monitored using the mobile bodies 1 or about the individual areas. The mobile body system performs the processes of S31 to S35 periodically. The user can check the situation of occurrences of events about multiple monitored areas, the area of the user's responsibility, or other areas, by seeing the displayed statistical result. The statistical result displayed on the display unit 26 is helpful for taking preventive measures for the events. For example, the number of events or the occurrence rate of an event by the area or the detail clarifies the frequently occurring event in individual areas. In addition, the statistical result with respect to the individual areas clarifies the area where an event occurs frequently. The security can be improved in the area where an event occurs frequently, by increasing the number of the mobile bodies 1, improving the route of the mobile body 1 in response to the event that occurs frequently, etc. In addition, it is possible for the user to check the event that occurs frequently in other areas and to improve the security to prevent that type of event in the area of the user's responsibility. In addition, the statistical result by the feature of a location of an event, or the date and time clarifies the feature of the place where an event occurs frequently or the feature of the date and time when an event occurs frequently. By improving the route of the mobile body 1 to monitor intensively the place where an event occurs frequently, or by improving the schedule of the mobile body 1 to monitor intensively at the date and time when an event occurs frequently, the security can be improved. In addition, if the statistical data 532 include the image data, the CPU 51 displays the image represented by the image data on the display unit 26. For example, the photographed image of an intruder is displayed so that the information about the intruder is shared through the multiple control apparatuses 2.

While, in the present embodiment, an example where the storage apparatus 5 transmits the statistical data 532 whenever executing the statistical processing is described, the storage apparatus 5 may be so embodied as to store the statistical data 532 and transmit the statistical data 532 to the control apparatus 2 on the request from the control apparatus 2. In such an embodiment, the control apparatus 2 obtains the statistical data 532 and displays the statistical result indicated in the statistical data 532, if necessary. Additionally, while in the present embodiment an example of the mobile body system comprising the storage apparatus 5 is described, the mobile body system may be so embodied as to exclude the storage apparatus 5 and configure the multiple control apparatuses 2 to be connected to each other via the communication network 6. In such an embodiment, the control apparatus 2 transmits the event information 232 to another control apparatus 2 and stores the event information 232 according to another control apparatus 2. In addition, the control apparatus 2 executes the statistical processing and displays the statistical result on the display unit 26. Such an embodiment also enables the user to improve the security based on the statistical result.

While, in Embodiments 1-3, an example where the control apparatus 2 mainly performs processing for controlling the mobile body 1 is described, the processing performed by the control apparatus 2 described in Embodiments 1-3 may be performed by the mobile body 1. For example, the mobile body 1 may detect the occurrence of the event, and display image including marker 31 overlaid on the map on a display unit. The mobile body 1 may transmit image data representing the image to the control apparatus 2 and the control apparatus 2 may display the image on the display unit 26. The mobile body 1 may include a display unit and display the image on the display unit. Furthermore, the mobile body 1 may store event information and execute statistical processing for the event information. The mobile body 1 may perform processing for generating a new route including a detour.

As described above, the mobile body system according to the present invention comprises the mobile body (1) performing photography and the control apparatus (2). In the mobile body system, the mobile body (1) includes a transmitting part (13) for transmitting to the control apparatus (2) image data presenting a photographed image and state information indicating a state of the mobile body. The control apparatus (2) includes the receiving part (25) for receiving the image data and the state information, a display unit (26) for displaying a map including a moving range of the mobile body (1), the event detecting part (S11) for detecting that a specific event occurs to the mobile body (1) based on the received image data or state information, the location detecting part (S12) for detecting a location of the mobile body (1) at the time of the occurrence of the event, based on the state information, and the marker displaying part (S14) for displaying on the display unit (26) a marker indicating the location detected by the location detecting part on the map.

In the mobile body system according to the present invention, a route of the mobile body (1) is displayed over the map on the display unit (26).

In the mobile body system according to the present invention, the marker displaying part (S14) displays a different marker (31) on the display unit (26) according to details of the event.

In the mobile body system according to the present invention, the control apparatus (2) further includes the storage unit (23) in which event information (232) including details of the event and the location is stored.

In the mobile body system according to the present invention, the event information (232) includes a time when the event detecting part (S11) has detected the occurrence of the event.

The mobile body system according to the present invention further comprises a plurality of the control apparatuses (2), and the storage apparatus (5) for storing the event information related to the plurality of control apparatuses. In the mobile body system, each of the plurality of control apparatuses (2) controls the mobile body (1) with a different moving range. The storage apparatus (5) includes the statistical processing part (S31) for executing statistical processing for the entire event information (232) related to all of the plurality of control apparatuses or for the event information related to each of the control apparatuses (232). The control apparatus (2) further includes the obtaining part (S34) for obtaining from the storage apparatus (5) a statistical result of the statistical processing executed by the statistical processing part (S31) and the statistical result displaying part (S35) for displaying the obtained statistical result on the display unit (26).

In the mobile body system according to the present invention, the control apparatus (2) further includes the display control unit (21) for displaying on the display unit (26) the photographed image represented by the image data simultaneously with the map.

In the mobile body system according to the present invention, the display control unit (21) divides a screen on the display unit (26), displays the map on one part of the divided screen on the display unit (26) and displays the photographed image on another part of the divided screen.

In the mobile body system according to the present invention, the display control unit (21) displays on the display unit (26) the photographed image simultaneously with the map, when the event detecting part (S11) detects the occurrence of the event.

In the mobile body system according to the present invention, the event detecting part (S11) detects a change in a state of the mobile body (1) as an event, based on the state information.

In the mobile body system according to the present invention, the event detecting part (S11) detects as an event that the mobile body (1) fails to pass a part of a predetermined route, and the control apparatus (2) further includes the route generating part (S25) for generating a route for detouring around a specific part of the predetermined route, when the number of occurrences of events that the mobile body (1) fails to pass the specific part is a predetermined number or more.

In the mobile body system according to the present invention, the control apparatus (2) further includes the event displaying part (S13) for displaying on the display unit

(26) an image indicating the occurrence of the event, when the event detecting part (S11) detects the occurrence of the event.

The control apparatus (2) according to the present invention for controlling a mobile body (1) performing photography comprises the receiving part (25) for receiving from the mobile body (1) image data representing a photographed image and a state information indicating a state of the mobile body (1), the display unit (26) for displaying a map including a moving range of the mobile body (1), the event detecting part (S11) for detecting that a specific event occurs to the mobile body (1), based on the received image data or the received state information, the location detecting part (S12) for detecting a location of the mobile body (1) at the time of the occurrence of the event, based on the state information, and the marker displaying part (S14) for displaying on the display unit (26) a marker indicating the location detected by the location detecting part (S12) on the map.

The control apparatus (2) according to the present invention further comprises the event displaying part (S13) for displaying on the display unit (26) an image indicating the occurrence of the event, when the event detecting part (S11) detects the occurrence of the event.

In the present invention, the mobile body (1) transmits to the control apparatus (2) the image data presenting the photographed image and the state information indicating the state thereof such as the location thereof. The control apparatus (2) displays on the display unit (26) the map including the moving range of the mobile body (1). Based on the received image data and state information, the control apparatus (2) detects an occurrence of an event, such as finding of an intruder, and the location of the mobile body (1) at the time of the occurrence of the event, and displays the marker (31) that indicates the detected location over the map. Whenever an event occurs, the additional marker (31) is displayed over the map and the history of the past events is recorded on the map.

Additionally, in the present invention, the route of the mobile body (1) is displayed over the map on the display unit (26). Accordingly, the location where an event has occurred on the route of the mobile body (1) is made clear.

Additionally, in the present invention, the control apparatus (2) displays different markers (31) over the map according to the different types of details of the individual events. The difference between the past events can be easily distinguished by seeing the map.

Additionally, in the present invention, the control apparatus (2) stores in the storage unit (23) the event information (232) including the details of the event and the location of the mobile body (1) detected in response to the detection of the event. In view of the event information (232), the details and location of the event can be checked.

Additionally, in the present invention, the event information (232) includes the time when the control apparatus (2) has detected the event. In view of the event information (232), the time of the event can be checked.

Additionally, in the present invention, the mobile body system comprises the multiple control apparatuses (2) and the storage apparatus (5). Each of the multiple control apparatuses (2) controls the mobile body (1) with a different moving range. The storage apparatus (5) stores the event information (232) about each control apparatus (2). The storage apparatus (5) executes the statistical processing for the event information (232) and the control apparatus (2) receives the statistical result to display it. The user can check the situation of an occurrence of an event in other areas.

Additionally, in the present invention, the control apparatus (2) displays on the display unit (26) the image photographed by the mobile body (1) simultaneously with the map. The user can monitor the photographed image while seeing the map.

Additionally, in the present invention, the control apparatus (2) divides the screen on the display unit (26) and displays a map on the one partial screen (41) and the photographed images on the other partial screens (42, 43). By dividing the screen, the map and the photographed images can be easily monitored separately.

Additionally, in the present invention, the control apparatus (2) displays the photographed image simultaneously with the map when detecting an event. The user can check the details of the event in view of the photographed image at the time the event occurs.

Additionally, in the present invention, the control apparatus (2) detects a change in the state of the mobile body (1) as an event. The user can perceive the state change of the mobile body (1) such as a change in the remaining capacity of the battery (16) or an occurrence of an abnormality.

Additionally, in the present embodiment, the control apparatus (2) detects as an event that the mobile body (1) fails to pass the predetermined route, and generates a new route for detouring around the part where such an event occurs more than a predetermined number of times. The route of the mobile body (1) can be improved.

Additionally, in the present embodiment, the control apparatus (2) displays an image indicating an occurrence of an event when detecting the event. The user is notified of the occurrence of the event.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A mobile body system, comprising:
an autonomous vehicle travelling autonomously;
a plurality of control apparatuses located outside the autonomous vehicle; and
a storage apparatus,
wherein the autonomous vehicle includes:
    a camera for capturing images of the surrounding of the autonomous vehicle;
    a sensor for detect condition of the autonomous vehicle when moving;
    a control unit for generating state information indicating the condition detected the sensor; and
    a transmitting part for transmitting image data representing the images captured by the camera and the state information to the control apparatus through a communication network,
the control apparatus includes:
    a communication unit for receiving the image data and the state information through the communication network;
    a display unit for displaying a map including a moving range of the autonomous vehicle;
    a processor; and a storage unit for storage the image data and instructions to be executed by the processor,
the processor executes instructions to determine whether an event occurs to the autonomous vehicle by determining whether specific change in the image data or the state information occurs,
the sensor detect a location of the autonomous vehicle,
the state information includes information indicating the location detected by the sensor,
the processor executes instructions to obtain a location of the autonomous vehicle at the time of the occurrence of the event from the state information,
the processor executes instructions to generate an image including the map and a marker indicating the location on the map,
the processor executes instructions to send the image including the map and the marker to the display unit and to display the image on the display unit,
the processor executes instructions to display a different marker according to details of the event on the display unit,
the storage apparatus stores event information including details of the event and the location, the event information is related to the plurality of control apparatuses,
each of the plurality of control apparatuses controls the autonomous vehicle with a different moving range,
the storage apparatus includes:
a statistical processing part for executing statistical processing for the entire event information related to all of the plurality of control apparatuses or for the event information related to each of the control apparatuses,
the communication unit receives from the storage apparatus a statistical result of the statistical processing executed by the statistical processing part, and
the processor executes instructions to display the statistical result on the display unit.

2. A method for controlling an autonomous vehicle including a camera and a sensor, comprising:
displaying on a display unit a map including a moving range of the autonomous vehicle;
determining whether an event occurs to the autonomous vehicle by determining whether specific change in image data representing images captured by the camera or in state information indicating condition of the autonomous vehicle when moving detected by the sensor;
obtaining a location of the autonomous vehicle at the time of the occurrence of the event from the state information;
displaying on the display unit the map and a marker indicating the location on the map;
displaying a different marker according to details of the event on the display unit;
storing event information including details of the event and the location;
executing statistical processing for the entire event information related to all of a plurality of autonomous vehicles or for the event information related to each of the autonomous vehicles; and
displaying statistical result of the statistical processing on the display unit.

3. The method according to claim 2, further comprising:
dividing a screen on the display unit;
displaying the map on one part of the divided screen on the display unit; and
displaying an image represented by the image data on another part of the divided screen.

4. The method according to claim 2, further comprising:
detecting as an event that the autonomous vehicle fails to pass a part of a predetermined route; and
generating a route for detouring around a specific part of the predetermined route, when the number of occurrences of events that the autonomous vehicle fails to pass the specific part is a predetermined number or more.

5. A non-transitory computer-readable medium having stored therein a program for causing a computer to execute a process of controlling an autonomous vehicle including a camera and a sensor, the process comprising:
a step of displaying a map including a moving range of the autonomous vehicle on a display unit of the computer;
a step of determining whether an event occurs to the autonomous vehicle by determining whether specific change in image data representing images captured by the camera or in state information indicating condition of the autonomous vehicle when moving detected by the sensor;
a step of obtaining a location of the autonomous vehicle at the time of the occurrence of the event from the state information;
a step of displaying on the display unit the map and a marker indicating the location on the map;
a step of displaying a different marker according to details of the event on the display unit;
a step of storing event information including details of the event and the location in a storage unit of the computer;
a step of obtaining statistical result of statistical processing for the entire event information related to all of a plurality of autonomous vehicles or for the event information related to each of the autonomous vehicles; and
a step of displaying the statistical result on the display unit.

6. A mobile body system, comprising:
an autonomous vehicle travelling autonomously; and
a control apparatus located outside the autonomous vehicle,
wherein the autonomous vehicle includes:
a camera for capturing images of the surrounding of the autonomous vehicle;
a sensor for detect condition of the autonomous vehicle when moving;
a control unit for generating state information indicating the condition detected the sensor; and
a transmitting part for transmitting image data representing the images captured by the camera and the state information to the control apparatus through a communication network,
the control apparatus includes:
a communication unit for receiving the image data and the state information through the communication network;
a display unit for displaying a map including a moving range of the autonomous vehicle;
a processor; and
a storage unit for storage the image data and instructions to be executed by the processor,
the processor executes instructions to determine whether an event occurs to the autonomous vehicle by determining whether specific change in the image data or the state information occurs,
the sensor detect a location of the autonomous vehicle, the state information includes information indicating the location detected by the sensor, the processor executes instructions to obtain a location of the autonomous vehicle at the time of the occurrence of the event from the state information, the processor executes instructions to generate an image including the map and a marker indicating the location on the map, the processor executes instructions to send the image including the map and the marker to the display unit and to display the image on the display unit, the processor executes instructions to display a different marker according to details of the event on the display unit, the processor executes instructions to determine a route of the autonomous vehicle, the processor executes instructions to generate an image including the map and the route overlaid on the map, and the processor executes instructions to display the image on the display unit.

7. A mobile body system, comprising:
an autonomous vehicle travelling autonomously; and
a control apparatus located outside the autonomous vehicle,
wherein the autonomous vehicle includes:
   a camera for capturing images of the surrounding of the autonomous vehicle;
   a sensor for detect condition of the autonomous vehicle when moving;
   a control unit for generating state information indicating the condition detected the sensor; and
   a transmitting part for transmitting image data representing the images captured by the camera and the state information to the control apparatus through a communication network,
the control apparatus includes:
   a communication unit for receiving the image data and the state information through the communication network;
   a display unit for displaying a map including a moving range of the autonomous vehicle;
   a processor; and
   a storage unit for storage the image data and instructions to be executed by the processor,
the processor executes instructions to determine whether an event occurs to the autonomous vehicle by determining whether specific change in the image data or the state information occurs,
the sensor detect a location of the autonomous vehicle,
the state information includes information indicating the location detected by the sensor,
the processor executes instructions to obtain a location of the autonomous vehicle at the time of the occurrence of the event from the state information,
the processor executes instructions to generate an image including the map and a marker indicating the location on the map,
the processor executes instructions to send the image including the map and the marker to the display unit and to display the image on the display unit,
the processor executes instructions to display a different marker according to details of the event on the display unit, and
the storage unit stores event information including details of the event and the location.

8. The mobile body system according to claim 7,
wherein the event information includes a time of the occurrence of the event.

9. The mobile body system according to claim 7,
wherein the processor executes instructions to execute statistical processing for the event information, and
the processor executes instructions to display statistical result of the statistical processing on the display unit.

10. A mobile body system, comprising:
an autonomous vehicle travelling autonomously; and
a control apparatus located outside the autonomous vehicle,
wherein the autonomous vehicle includes:
   a camera for capturing images of the surrounding of the autonomous vehicle;
   a sensor for detect condition of the autonomous vehicle when moving;
   a control unit for generating state information indicating the condition detected the sensor; and
   a transmitting part for transmitting image data representing the images captured by the camera and the state information to the control apparatus through a communication network,
the control apparatus includes:
   a communication unit for receiving the image data and the state information through the communication network;
   a display unit for displaying a map including a moving range of the autonomous vehicle;
   a processor; and
   a storage unit for storage the image data and instructions to be executed by the processor,
the processor executes instructions to determine whether an event occurs to the autonomous vehicle by determining whether specific change in the image data or the state information occurs,
the sensor detect a location of the autonomous vehicle,
the state information includes information indicating the location detected by the sensor,
the processor executes instructions to obtain a location of the autonomous vehicle at the time of the occurrence of the event from the state information,
the processor executes instructions to generate an image including the map and a marker indicating the location on the map,
the processor executes instructions to send the image including the map and the marker to the display unit and to display the image on the display unit,
the processor executes instructions to display a different marker according to details of the event on the display unit,
the processor executes instructions to generate an image including the map and an captured image represented by the image data overlaid on the map, and
the processor executes instructions to display the image on the display unit.

11. The mobile body system according to claim 10,
wherein the processor executes instructions to generate an image that is divided to plurality of parts and that includes the map on one part and the captured image on another part.

12. The mobile body system according to claim 10,
wherein the processor executes instructions to display the image including the map and the captured image on the display unit, when the occurrence of the event is determined.

13. A mobile body system, comprising:
an autonomous vehicle travelling autonomously; and a control apparatus located outside the autonomous vehicle, wherein the autonomous vehicle includes:
- a camera for capturing images of the surrounding of the autonomous vehicle;
- a sensor for detect condition of the autonomous vehicle when moving;
- a control unit for generating state information indicating the condition detected the sensor; and
- a transmitting part for transmitting image data representing the images captured by the camera and the state information to the control apparatus through a communication network, the control apparatus includes:
- a communication unit for receiving the image data and the state information through the communication network;
- a display unit for displaying a map including a moving range of the autonomous vehicle;
- a processor; and
- a storage unit for storage the image data and instructions to be executed by the processor, the processor executes instructions to determine whether an event occurs to the autonomous vehicle by determining whether specific change in the image data or the state information occurs, the sensor detect a location of the autonomous vehicle, the state information includes information indicating the location detected by the sensor, the processor executes instructions to obtain a location of the autonomous vehicle at the time of the occurrence of the event from the state information, the processor executes instructions to generate an image including the map and a marker indicating the location on the map, the processor executes instructions to send the image including the map and the marker to the display unit and to display the image on the display unit, the processor executes instructions to display a different marker according to details of the event on the display unit, the processor executes instructions to generate a route of the autonomous vehicle for detouring around a part of a predetermined route, the processor executes instructions to determine occurrence of an event that the autonomous vehicle fails to pass a part of the predetermined route, and the processor executes instructions to generates the route for detouring around a specific part of the predetermined route, when the number of occurrences of events that the autonomous vehicle fails to pass the specific part is a predetermined number or more.

14. A mobile body system, comprising:

an autonomous vehicle travelling autonomously; and a control apparatus located outside the autonomous vehicle, wherein the autonomous vehicle includes:
- a camera for capturing images of the surrounding of the autonomous vehicle;
- a sensor for detect condition of the autonomous vehicle when moving;
- a control unit for generating state information indicating the condition detected the sensor; and
- a transmitting part for transmitting image data representing the images captured by the camera and the state information to the control apparatus through a communication network, the control apparatus includes:
- a communication unit for receiving the image data and the state information through the communication network;
- a display unit for displaying a map including a moving range of the autonomous vehicle;
- a processor; and
- a storage unit for storage the image data and instructions to be executed by the processor, the processor executes instructions to determine whether an event occurs to the autonomous vehicle by determining whether specific change in the image data or the state information occurs, the sensor detect a location of the autonomous vehicle, the state information includes information indicating the location detected by the sensor, the processor executes instructions to obtain a location of the autonomous vehicle at the time of the occurrence of the event from the state information, the processor executes instructions to generate an image including the map and a marker indicating the location on the map, the processor executes instructions to send the image including the map and the marker to the display unit and to display the image on the display unit, the processor executes instructions to display a different marker according to details of the event on the display unit, the processor executes instructions to generate an image indicating the occurrence of the event, and the processor executes instructions to display the image on the display unit, when the occurrence of the event is determined.

\* \* \* \* \*